UNITED STATES PATENT OFFICE.

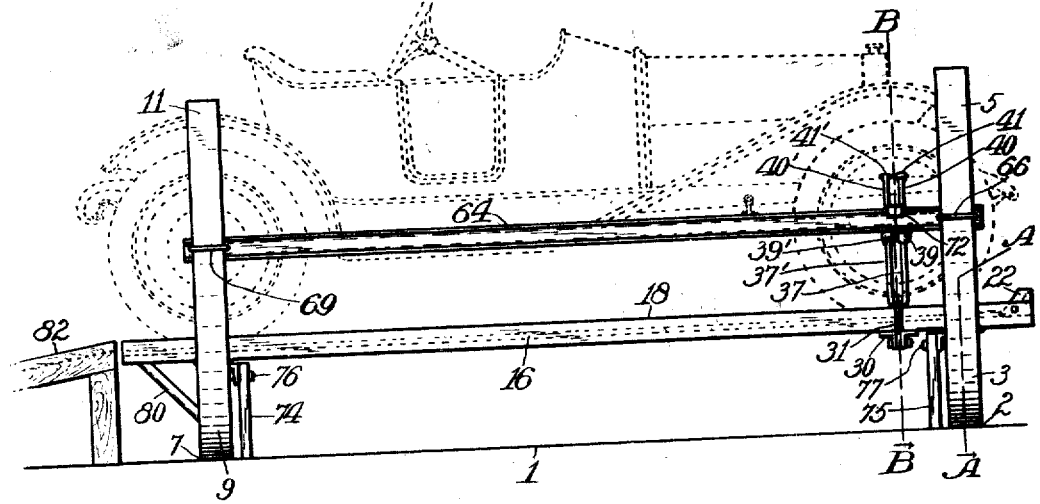
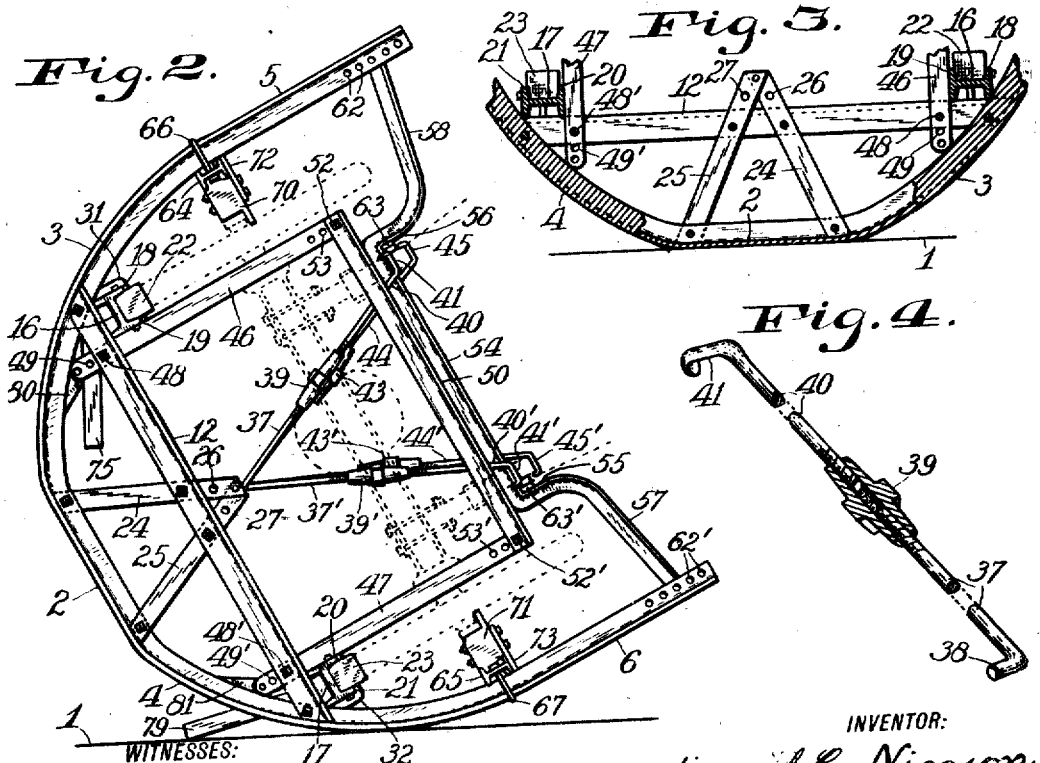
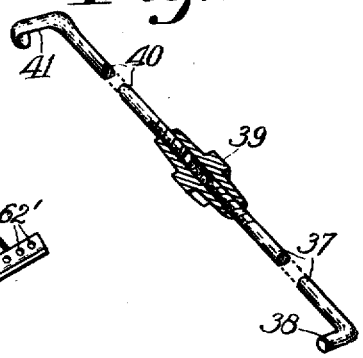

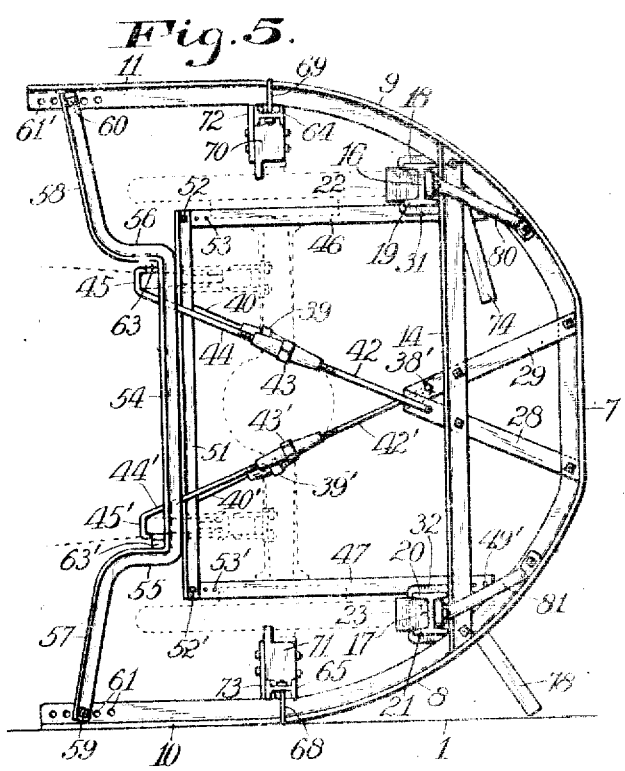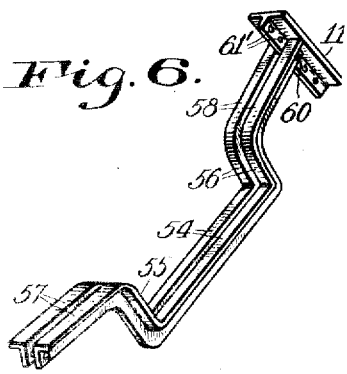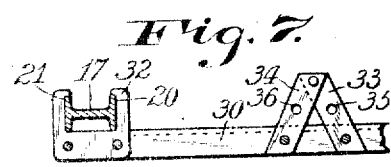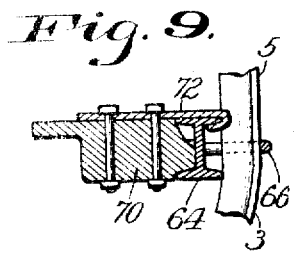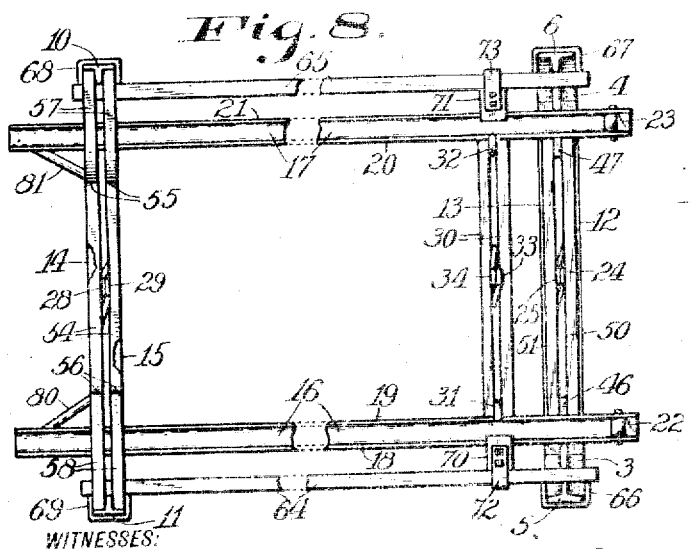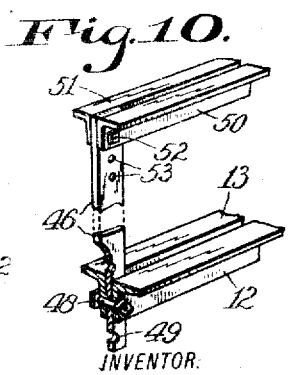

LEMUEL CLAY NICOSON, OF ALEXANDRIA, INDIANA.

ADJUSTABLE AUTOMOBILE-HOLDER.

1,288,138.

Specification of Letters Patent.

Patented Dec. 17, 1918.

Application filed April 24, 1916. Serial No. 93,239.

*To all whom it may concern:*

Be it known that I, LEMUEL CLAY NICOSON, a citizen of the United States, residing at Alexandria, in the county of Madison and State of Indiana, have invented a new and useful Adjustable Automobile-Holder, of which the following is a specification, reference being had to the accompanying drawings and to the letters and figures of reference marked thereon.

This invention relates to an adjustable structure that is designed to be used in shops, garages or elsewhere for adjustably holding a vehicle, and especially an automobile or similar self-propelling vehicle having carrying wheels, to enable the workman to conveniently have access to the under portions or mechanism of the vehicle; the invention having reference more particularly to a holder that is provided with means for securing the vehicle to the holder, the holder being constructed so as to permit it to be easily rolled or turned over from its normally level position so as to turn the vehicle over on one side or the other or partially so.

An object of the invention is to provide a simple and inexpensive open-work or skeleton structure whereby a vehicle may be supported and turned or tilted so that one side shall be higher than the other side of the vehicle, and which shall provide the maximum clearance space to permit workmen to conveniently get at the under parts of the vehicle, either for making repairs, cleaning or re-painting the vehicle. Another object is to so construct a holder of the above mentioned character as to permit the vehicle to be tilted over without imposing strains on the vehicle to which parts of the latter may not be capable of successfully withstanding. A further object is to provide a holder of the above mentioned character that shall be adaptable for supporting the body of the vehicle while the running gear or other parts thereof may be removed for repairs, or to permit the workmen to have access to other parts of the vehicle.

With the above-mentioned and other objects in view, the invention consists in a novel adjustable frame for supporting a vehicle in convenient position to be worked upon. The invention consists also further in the novel parts and in the combinations and arrangements of parts, as hereinafter particularly described and further defined in the accompanying claims.

Referring to the drawings, Figure 1 is a side elevation of the vehicle holder and an automobile shown by broken lines therein; Fig. 2 is a front elevation of the vehicle holder tilted so that a workman can conveniently have access to one side and also the under parts of the vehicle, portions of the latter being shown by broken lines; Fig. 3 is a fragmentary transverse section approximately on the line A A on Fig. 1; Fig. 4 is a perspective view, partially broken away, of one of the stay-rods employed for securing the vehicle in the holder; Fig. 5 is a rear elevation of the vehicle holder turned over on one side thereof to support a vehicle on its side, a portion of the latter being shown by broken lines; Fig. 6 is a perspective view of one of the removable parts of the vehicle holder that is designed for firmly holding a portion of the vehicle body safely in proper position in the vehicle holder; Fig. 7 is a fragmentary transverse section on the line B B on Fig. 1; Fig. 8 is a top plan of the vehicle holder, partially broken away; Fig. 9 is a fragmentary section also on the line B B on Fig. 1; and, Fig. 10 is a fragmentary perspective view of an adjustable trestle with which the vehicle holder is provided for supporting a portion of the vehicle or its body independently of the track rails and wheels of the vehicle.

Similar reference characters on the various figures of the drawings indicate corresponding elements or features of construction herein referred to.

On the drawings, the numeral 1 indicates the floor or ground on which the vehicle holder is supported. The vehicle-holder or cradle in which to turn the vehicle over sidewise comprises a skeleton-like frame whose members offer the least obstruction to workmen engaged in repairing a vehicle therein. The frame comprises two rocker members that are spaced apart a distance approximately equal to the space between the axles of the larger type of automobile or other motor vehicle, each rocker member being composed of metal, preferably T-section iron or steel, bent to the required contour. One of the rocker members preferably has a straight base portion 2 that normally rests upon the floor or ground 1, curved portions 3 and 4 extending outwardly and upwardly from the ends of the base portion, and straight side portions 5 and 6 extending upward from the curved portions respectively. The other rocker member likewise has a straight base portion 7, curved portions 8 and 9 extending from the base portion and straight portions 10 and 11 extending upward from the curved portions respectively. The two rocker members are alike in contour, both being so constructed that they may be rolled over onto either side thereof, the straight or flat base portions thereof, however, enabling the members to normally stand uprightly alone in balanced position. The rocker members of the frame suitably support two track rails on an approximately level plane and for this purpose two girders preferably are provided as parts of the frame, one girder comprising two members 12 and 13 that are secured to the curved portions 3 and 4, the other comprising two members 14 and 15 that are secured to the curved portions 8 and 9. Two stringers which constitute track rails 16 and 17 are suitably spaced apart and secured upon the two compound girders above described. One of the rails preferably has a flange 18 upon one side portion thereof and preferably a similar flange 19 on the opposite side portion, the rail 17 having similar flanges 20 and 21 thereon. The flanges assist to prevent the wheels of the vehicle from sliding laterally from the rails when the holder is adjusted so as to tilt the vehicle, and they conveniently guide the wheels when rolling on the rails. Preferably the rails are provided with stop blocks 22 and 23 respectively on one end thereof. Preferably the holder frame is trussed by means of truss members 24 and 25 secured to the base portion 2 and extending between the girder members 12 and 13 to which they are secured, the truss members extending upward convergently and having their upper ends secured together above the girder. The truss members have apertures 26 and 27 therein above the girder to permit stay-rods to be conveniently connected with the frame of the holder. The frame is similarly trussed also by means of truss members 28 and 29 secured to the straight portion 7 of the other rocker member and secured also to the girder members 14 and 15, these truss members being also adapted to have the stay-rods connected thereto. In some cases, while it is desirable that the axles of the vehicle be placed above the girders, the vehicle may be too short to permit such arrangement, and therefore a cross-bar 30 is provided which may be built up of several pieces and is arranged under the track rails transversely thereof and so as to be adjustably shifted longitudinally of the rails, the cross-bar being provided with hangers 31 and 32 that have support upon the tops of the rail flanges. Suitable means is provided whereby the stay-rods hereinafter described may be detachably connected to the cross-bar, the middle portion of the latter preferably having two anchor plates 33 and 34 secured thereto, the plates having apertures 35 and 36 therein respectively in which the stay-rods may be connected to the plates.

A plurality of stay-rods are provided, there being two for securing the forward portion and two for securing the rear portion of the vehicle to the vehicle holder. As preferably constructed, two of the stay-rods comprise screw-rods 37 and 37', each having a lug 38 on one end to be inserted in either of the apertures 26 or 27, or the apertures 35 or 36, the opposite ends of the screw-rods being connected with turnbuckles 39 and 39' respectively, to which screw-rods 40 and 40' are respectively connected, the screw-rods being provided with hooks 41 and 41' respectively to be connected with different portions of the vehicle frame. The remaining two stay-rods comprise screw-rods 42 and 42', having lugs 38' thereon, the screw-rods being connected with turnbuckles 43 and 43' respectively to which screw-rods 44 and 44' are respectively connected, the latter having hooks 45 and 45' thereon respectively to be connected with portions of the vehicle frame. Two of the stay-rods when connected with two truss members normally extend upward divergently, each approximately in alinement with the truss member to which it is connected, so that the two stay-rods and the two truss members constitute substantially an X-shaped brace.

Suitable appliances are provided whereby the body and frame or other portions of the vehicle may be bodily supported while the wheels and axles or other parts of the vehicle may be removed, one form of appliance preferably being trestle-like and preferably comprising two standards 46 and 47 that are adjustably arranged between the members 12 and 13 of one of the girders and adjacent to the inner side of the track rails 16 and 17 respectively, the standards being removably secured to the girder by means of suitable devices 48 and 48', the standards having holes 49 and 49' to receive the devices respectively. The standards support a beam which is designed to bodily support either end of a vehicle frame and preferably comprises two members 50 and 51 that are removably secured to the standards by suitable devices such as bolts 52 and 52', the upper portions of the standards preferably having a plurality of holes 53 and 53' to receive the securing devices respectively. The trestle-like appliance is suitable to be assembled for supporting the forward portion of the vehicle frame. Another form of appliance, that is particularly suitable for supporting the rearward portion of the vehicle frame, comprises a beam which may be made of two members. The beam comprises a straight portion 54 on which the vehicle frame or the body may be supported; two upright side portions 55 and 56 on opposite ends respectively of the straight portion, and hanger portions 57 and 58 extending from the tops of the side portions respectively, the ends of the hanger portions being removably secured to the side portions 10 and 11 of one of the rocker members by means of bolts 59 and 60 respectively, the portions 9 and 10 having bolt holes 61 and 61' therein respectively to permit the beam to be adjustably supported at different distances from the plane of the track rails. The upper portions of the other one of the rocker members also have bolt holes 62 and 62' respectively to receive the bolts 59 and 60, so that the supporting beam may be secured in like manner to the other rocker member of the frame. Suitable filling blocks 63 and 63' are provided to be placed against the upright portions 55 and 56 of the beam and against the outer sides of the vehicle frame for preventing lateral movement of the vehicle body in the holder when tilted.

For the purpose of relieving the vehicle wheels of torsional strains when the vehicle is tilted, two side rails 64 and 65 are provided and arranged longitudinally with respect to the track rails, the side rails being secured to permit vertical adjustment on the rocker members. The side rails are secured at one end to the side portions 5 and 6 preferably by means of U-bolts 66 and 67 respectively, the opposite ends being secured to the portions 10 and 11 by means of U-bolts 68 and 69 respectively. Suitable blocks 70 and 71 are fitted to the side rails and provided with lugged guide plates 72 and 73 that slidingly engage the side rails respectively so that the blocks may be brought to the position of the outer ends of the wheel hubs, or the blocks may be designed to be adjusted so as to have contact with other portions of the motor vehicle, to bodily support the latter when turned over on its side.

The frame of the vehicle holder preferably is provided on one side with props 74 and 75 that are connected to the frame by means of pivots 76 and 77 respectively, the opposite side of the frame being likewise provided with props 78 and 79, for steadying or holding the frame in the desired position. Preferably the ends of the track rails that are open for the passage of the vehicle wheels are provided with braces 80 and 81 respectively that are secured to the curved side portions of the adjacent rocker member. A suitable incline track or runway 82 is provided and arranged at the braced end of the track rails for guiding the vehicle wheels up to or downward from the track rails.

In practical use, the vehicle holder is placed in normal position and stripped of impediments to the entrance of a vehicle thereto, after which an automobile or other vehicle is moved on to the track rails, preferably head first and the rear axle thereof placed over the rearward one of the frame girders, the forward axle preferably being over the other one of the girders but if such is not possible, the cross-bar 30 is shifted to bring it under the forward axle in case it is necessary to tilt the vehicle or turn it upon its side. In some cases the necessary repairs to the vehicle may be made without especially adjusting the vehicle in the holder frame, but if it is necessary to tilt or turn over the vehicle it is secured to the holder frame by means of the securing devices hereinbefore described and as explained, or by such of the securing devices as may be necessary. When the automobile holder is turned over, as well as when in normal position, it may be secured against accidental movement by means of chock blocks, as would be understood. In case it is desired to support the body of the vehicle, the beams 50 and 54 are placed beneath the vehicle frame, or either beam may be so placed, and secured to the support designed therefor, parts of the vehicle that may be obstructive being removed; or, in some cases the beams may be arranged above the vehicle and support slings which may be connected to the vehicle frame. Various expedients will suggest themselves as contingencies may arise in practice, depending upon the sizes and models of the vehicles requiring to be handled. The purposes and functions of the various parts of the structure having been described and explained herein-before, the uses thereof will be clearly understood without further description.

Having thus described the invention, what is claimed as new is—

1. A motor-vehicle holder including a plurality of rocker members, a plurality of girders secured to the rocker members respectively, two track rails secured upon the girders to support the wheels of the motor-vehicle, means for bodily supporting the body of the motor-vehicle in the absence of a pair of the wheels and above and independently of the track rails, the supporting means including a beam to engage the under side of the body and being removably supported by means of the rocker members, and means for clamping the vehicle body to the beam of the supporting means.

2. In a vehicle-holder, the combination of two frame members, each member having a bottom portion and two side portions, two track rails supported by means of the side portions respectively of the two frame members, props connected pivotally with said side portions, a side rail adjustably connected to one of the side portions of each of said frame members, and a block adjustably connected with said side rail.

3. In a vehicle-holder, the combination of a frame member having a bottom portion and two curved side portions, a girder arranged above the bottom portion of the frame member and secured at its ends to said side portions, the girder having vertical openings therein near its ends, track rails secured upon said girder adjacent to said side portions respectively and having each a longitudinal guide flange on its top, two standards removably inserted in the openings in said girder adjacent to the inner sides of said rails respectively and adjustably supported by the girder, and a beam supported by said standards.

4. In a vehicle-holder, the combination of a frame member having a bottom portion and two curved side portions, a girder arranged above the bottom portion of the frame member and secured at its ends to the said side portions, track rails secured upon the said girder adjacent to said side portions respectively, truss members secured to the said bottom portion and extending upward beyond said girder, said truss members being secured to said girder and having each an aperture therein above the girder whereby to connect a stay-rod with the frame member, and stay-rods having hooks in the apertures of the truss members.

5. In a vehicle-holder, the combination of two frame members having curved lower side portions, two girders secured to the curved portions of the frame members respectively, two track rails secured upon said girders, each rail having two flanges thereon, and a cross-bar transversely arranged beneath the track rails and provided with hangers engaging the flanges of the rails respectively to permit movement of the cross-bar longitudinally of the rails, the middle portion of the cross-bar having an anchor device provided with apertures whereby stay-rods may be connected to the cross-bar.

6. In a vehicle-holder, the combination of a frame member having a bottom portion and two curved side portions, said member having also two straight side portions extending from said curved portions, two track rails connected substantially with said curved side portions, and a beam comprising a straight middle portion and side portions extending upward from the ends respectively of the middle portion, the beam comprising also two hanger portions extending outwardly from the side portions, said hanger portions being adjustably and removably supported on said straight side portions of the frame member.

7. In a motor-vehicle holder, a skeleton frame comprising two main members spaced a distance apart, each member having curved supporting portions and also side portions normally extending upwardly from the curved portions, two girders rigidly secured to the main members respectively at the curved portions thereof, two stringers rigidly secured adjacent to their end portions to the two girders to support the carrying wheels of the motor-vehicle, and props pivotally connected with the curved portions of one of the main members.

In testimony whereof, I affix my signature in presence of two witnesses.

LEMUEL CLAY NICOSON.

Witnesses:
EDGAR J. ELLSWORTH,
WALTER MAY.